US011367105B2

(12) United States Patent
Deng et al.

(10) Patent No.: US 11,367,105 B2
(45) Date of Patent: Jun. 21, 2022

(54) DYNAMIC EVALUATION AND USE OF GLOBAL AND CONTEXTUAL PERSONAS

(71) Applicant: Walmart Apollo, LLC, Bentonville, AR (US)

(72) Inventors: Yang Deng, Foster City, CA (US); Omkar Deshpande, Saratoga, CA (US); Afroza Ali, Los Altos, CA (US); Abhimanyu Mitra, San Jose, CA (US); Kannan Achan, Saratoga, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/748,371

(22) Filed: Jan. 21, 2020

(65) Prior Publication Data
US 2021/0224848 A1     Jul. 22, 2021

(51) Int. Cl.
*G06Q 30/02*         (2012.01)

(52) U.S. Cl.
CPC ..... *G06Q 30/0255* (2013.01); *G06Q 30/0246* (2013.01); *G06Q 30/0268* (2013.01)

(58) Field of Classification Search
CPC .......... G06Q 30/0255; G06Q 30/0268; G06Q 30/0246
See application file for complete search history.

(56) References Cited

U.S. PATENT DOCUMENTS

| | | | |
|---|---|---|---|
| 8,458,103 B2 | 6/2013 | Brooks et al. | |
| 9,361,322 B1 | 6/2016 | Dutta et al. | |
| 9,519,916 B2 | 12/2016 | Brooks et al. | |
| 10,242,381 B1 | 3/2019 | Zappella et al. | |
| 10,404,566 B2 | 9/2019 | Gomez-Uribe | |
| 10,467,313 B2 | 11/2019 | Wang et al. | |
| 10,521,824 B1 | 12/2019 | Boshy et al. | |
| 10,545,624 B2 | 1/2020 | Meyerzon et al. | |
| 10,600,004 B1 | 3/2020 | Misko et al. | |
| 10,747,805 B1 | 8/2020 | Bragdon | |
| 2012/0023043 A1* | 1/2012 | Cetin | G06Q 30/0254 706/12 |
| 2014/0108640 A1 | 4/2014 | Mathis | |

(Continued)

FOREIGN PATENT DOCUMENTS

WO     20170042626 A1     1/2017

OTHER PUBLICATIONS

"Cohort Modeling for Enhanced Personalized Search" (Yan, Jinyun; Chu, Wei; White, Ryen; SIGIR'14 Jul. 6-11, 2014; http://ryenwhite.com/papers/YanSIGIR2014.pdf) (Year: 2014).*

(Continued)

*Primary Examiner* — James M Detweiler
(74) *Attorney, Agent, or Firm* — Duane Morris LLP; Manita Rawat

(57) ABSTRACT

A system and method for content selection and presentation is disclosed. A plurality of content elements configured for presentation in at least one content container is received and one of the plurality of content elements is selected for presentation in the at least one content container. The one of the plurality of content elements is selected by a trained selection model configured to select one of an individual context or a global context. An interface including the selected one of the plurality of content elements is generated.

15 Claims, 5 Drawing Sheets

(56) References Cited

U.S. PATENT DOCUMENTS

| | | | |
|---|---|---|---|
| 2016/0191450 A1* | 6/2016 | Lineberger | H04L 51/32 |
| | | | 709/206 |
| 2016/0191650 A1 | 6/2016 | Rong et al. | |
| 2017/0300939 A1 | 10/2017 | Chittilappilly et al. | |
| 2018/0121964 A1* | 5/2018 | Zhang | G06N 20/00 |
| 2018/0174038 A1 | 6/2018 | Jiang et al. | |
| 2018/0189826 A1 | 7/2018 | Xu et al. | |
| 2019/0050754 A1 | 2/2019 | Assem Aly Salama et al. | |
| 2019/0220460 A1 | 7/2019 | Harmsen et al. | |
| 2019/0311287 A1 | 10/2019 | Chew et al. | |
| 2019/0363966 A1 | 11/2019 | Gomez-Uribe | |
| 2020/0019636 A1* | 1/2020 | Srinivasaraghavan | |
| | | | G06Q 30/0603 |
| 2020/0033144 A1 | 1/2020 | Du et al. | |
| 2020/0042920 A1 | 2/2020 | Moorthy et al. | |
| 2020/0327577 A1* | 10/2020 | Truong | G06Q 30/0246 |
| 2020/0342500 A1 | 10/2020 | Kulkarni et al. | |
| 2021/0004868 A1 | 1/2021 | Montgomery et al. | |
| 2021/0142118 A1 | 5/2021 | Lugt et al. | |
| 2021/0224082 A1 | 7/2021 | Suo et al. | |

OTHER PUBLICATIONS

Broden et al. "Ensemble Recommendations via Thompson Sampling: an Experimental Study within e-commerce", Mar. 2018 https://dl.acm.org/doi/pdf/10.1145/3172944.3172967 (Year: 2018).

Sherrick, An Introduction To Graphical User Interfaces and Their Use By Citis, Jul. 1992 https://hvlpubs.nist.gov/nistpubs/Legacy/IR/nistir4876.pdf (Year: 1992).

Chapelle et al. ("An Empirical Evaluation of Thompson Sampling"), 2011 https://proceedings.neurips.cc/paper/2011/file/e53a0a2978c28872a4505bdb51 db06dc-Paper.pdf (Year: 2011).

Russo et al. ("An Information—Theoretic Analysis of Thompson Sampling"), Apr. 2016 https://www.jmlr.org/papers/volume 17/14-087/14-087. pdf (Year: 2016).

* cited by examiner

DYNAMIC EVALUATION AND USE OF GLOBAL AND CONTEXTUAL PERSONAS

TECHNICAL FIELD

This application relates generally to content prediction and, more particularly, to selection of content elements using trained selection models.

BACKGROUND

Various network interfaces, such as e-commerce interfaces, are configured to present one or more interface pages including a plurality of containers (or slots). A plurality of content elements may be available for each container. For example, in e-commerce environments, a carousel module may have multiple options for filling the open spots on the carousel.

Current interface systems are configured to select elements for filling open containers or slots in an interface based on short-term reward mechanisms for static personas. For example, in some embodiments, an element having the highest click-through rate (CTR) may be selected for presentation to a user. Short-term reward mechanisms and systems are prone to randomness and noise, and fail to take into account long-term or changing user preferences. In addition, customer personas may change, due to time or circumstances.

SUMMARY

In various embodiments, a system for content selection and presentation is disclosed. The system includes a computing device configured to receive a plurality of content elements configured for presentation in at least one content container, select one of the plurality of content elements for presentation in the at least one content container, and generate an interface including the selected one of the plurality of content elements. The one of the plurality of content elements is selected by a trained selection model configured to select one of an individual context or a global context.

In various embodiments, a non-transitory computer readable medium having instructions stored thereon is disclosed. The instructions, when executed by a processor cause a device to perform operations including receiving a plurality of content elements configured for presentation in at least one content container, selecting one of the plurality of content elements for presentation in the at least one content container, and generating an interface including the selected one of the plurality of content elements. The one of the plurality of content elements is selected by a trained selection model configured to select one of an individual context or a global context.

In various embodiments, a computer-implemented method is disclosed. The method includes steps of receiving a plurality of content elements configured for presentation in at least one content container, selecting one of the plurality of content elements for presentation in the at least one content container, and generating an interface including the selected one of the plurality of content elements. The one of the plurality of content elements is selected by a trained selection model configured to select one of an individual context or a global context.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
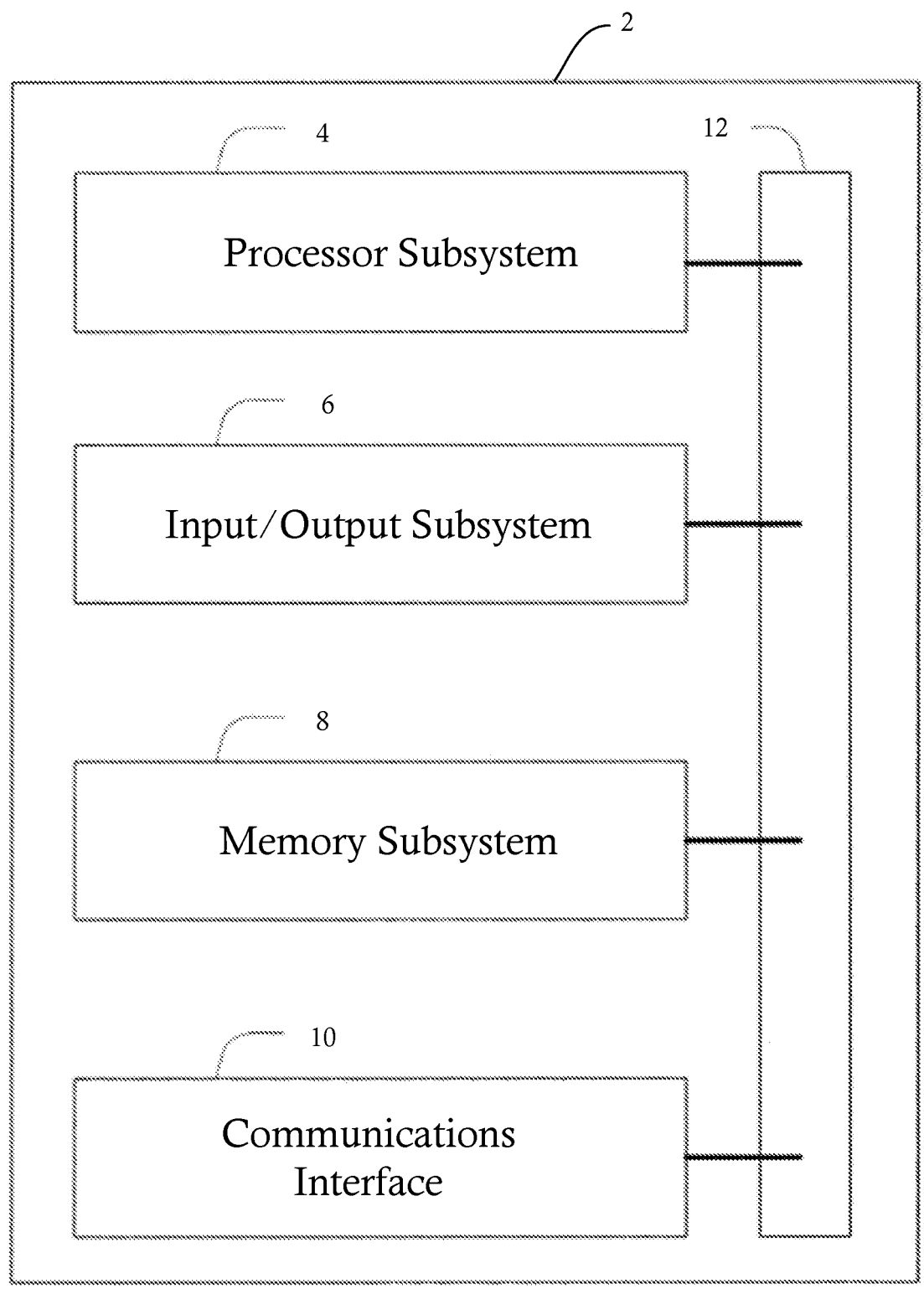
FIG. 1 illustrates a block diagram of a computer system, in accordance with some embodiments.

The description of the preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In this description, relative terms such as "horizontal," "vertical," "up," "down," "top," "bottom," as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both moveable or rigid attachments or relationships, unless expressly described otherwise. The term "operatively coupled" is such an attachment, coupling, or connection that allows the pertinent structures to operate as intended by virtue of that relationship. In the claims, means-plus-function clauses, if used, are intended to cover structures described, suggested, or rendered obvious by the written description or drawings for performing the recited function, including not only structure equivalents but also equivalent structures.

FIG. 1 illustrates a computer system configured to implement one or more processes, in accordance with some embodiments. The system 2 is a representative device and may comprise a processor subsystem 4, an input/output subsystem 6, a memory subsystem 8, a communications interface 10, and a system bus 12. In some embodiments, one or more than one of the system 2 components may be combined or omitted such as, for example, not including an input/output subsystem 6. In some embodiments, the system 2 may comprise other components not combined or comprised in those shown in FIG. 1. For example, the system 2 may also include, for example, a power subsystem. In other embodiments, the system 2 may include several instances of the components shown in FIG. 1. For example, the system 2 may include multiple memory subsystems 8. For the sake of conciseness and clarity, and not limitation, one of each of the components is shown in FIG. 1.

The processor subsystem 4 may include any processing circuitry operative to control the operations and performance of the system 2. In various aspects, the processor subsystem 4 may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also may be implemented by a controller, a microcontroller, an application specific integrated circuit (ASIC), a field programmable gate array (FPGA), a programmable logic device (PLD), and so forth.

In various aspects, the processor subsystem 4 may be arranged to run an operating system (OS) and various applications. Examples of an OS comprise, for example, operating systems generally known under the trade name of Apple OS, Microsoft Windows OS, Android OS, Linux OS, and any other proprietary or open source OS. Examples of applications comprise, for example, network applications, local applications, data input/output applications, user interaction applications, etc.

In some embodiments, the system 2 may comprise a system bus 12 that couples various system components including the processing subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, the input/output subsystem 6 may include any suitable mechanism or component to enable a user to provide input to system 2 and the system 2 to provide output to the user. For example, the input/output subsystem 6 may include any suitable input mechanism, including but not limited to, a button, keypad, keyboard, click wheel, touch screen, motion sensor, microphone, camera, etc.

In some embodiments, the input/output subsystem 6 may include a visual peripheral output device for providing a display visible to the user. For example, the visual peripheral output device may include a screen such as, for example, a Liquid Crystal Display (LCD) screen. As another example, the visual peripheral output device may include a movable display or projecting system for providing a display of content on a surface remote from the system 2. In some embodiments, the visual peripheral output device can include a coder/decoder, also known as Codecs, to convert digital media data into analog signals. For example, the visual peripheral output device may include video Codecs, audio Codecs, or any other suitable type of Codec.

The visual peripheral output device may include display drivers, circuitry for driving display drivers, or both. The visual peripheral output device may be operative to display content under the direction of the processor subsystem 6. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 may include any suitable hardware, software, or combination of hardware and software that is capable of coupling the system 2 to one or more networks and/or additional devices. The communications interface 10 may be arranged to operate with any suitable technique for controlling information signals using a desired set of communications protocols, services or operating procedures. The communications interface 10 may comprise the appropriate physical connectors to connect with a corresponding communications medium, whether wired or wireless.

Vehicles of communication comprise a network. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 may comprise a wireless interface comprising one or more antennas, transmitters, receivers, transceivers, amplifiers, filters, control logic, and so forth.

In various aspects, the communications interface 10 may provide data communications functionality in accordance with a number of protocols. Examples of protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols (e.g., Bluetooth Specification versions 5.0, 6, 7, legacy Bluetooth protocols, etc.) as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 may comprise any machine-readable or computer-readable media capable of storing data, including both volatile/non-volatile memory and removable/non-removable memory. The memory subsystem 8 may comprise at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various components of the system 2.

In various aspects, the memory subsystem 8 may comprise any machine-readable or computer-readable media capable of storing data, including both volatile/non-volatile memory and removable/non-removable memory. For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 may contain an instruction set, in the form of a file for executing various methods, such as methods including A/B testing and cache optimization, as described herein. The instruction set may be stored in any acceptable form of machine readable instructions, including source code or various appropriate programming languages. Some examples of programming languages that may be used to store the instruction set comprise, but are not limited to: Java, C, C++, C #, Python, Objective-C, Visual Basic, or .NET programming. In some embodiments a compiler or interpreter is comprised to convert the instruction set into machine executable code for execution by the processing subsystem 4.

Figure 2:
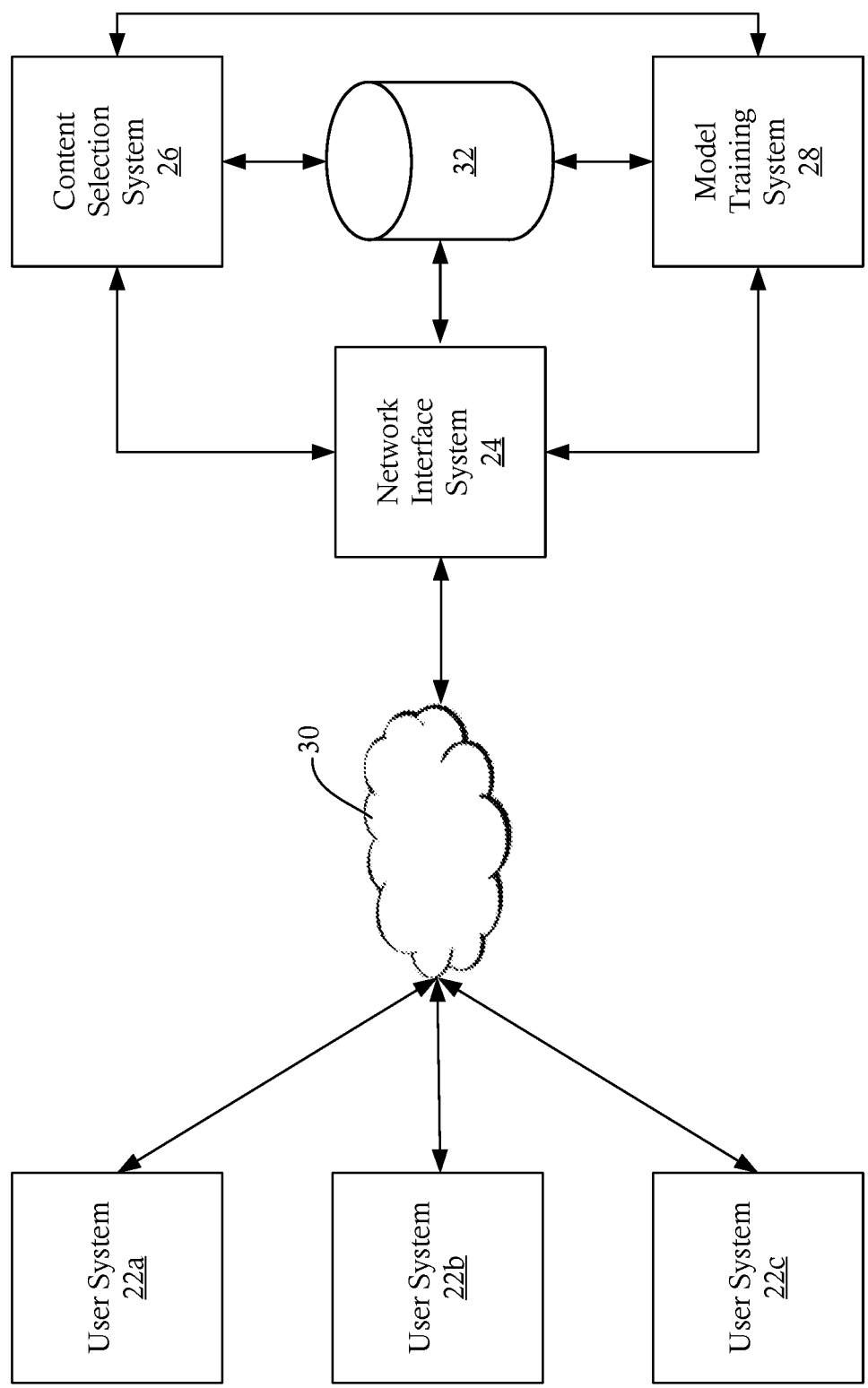
FIG. 2 illustrates a network configured to provide an interface including one or more components selected using a trained content selection model configured to implement an optimal impression allocation, in accordance with some embodiments.

FIG. 2 illustrates a network environment 20 configured to provide one or more components having content selected using a trained content selection network, in accordance with some embodiments. The network 20 includes one or more user systems 22a-22c, a network interface system 24, a content selection system 26, a model training system 28, and/or any other suitable system. Each of the systems 22a-28 can include a computer system, such as the computer system 2 described above in conjunction with FIG. 1. It will be appreciated that each of the systems 22a-28 can include generic systems and/or special purpose systems, and are within the scope of this disclosure.

Each of the systems 22a-28 are configured to exchange data over one or more networks, such as, for example, network 30. In some embodiments, the one or more user devices 22a-22c are configured to communicate with the network interface system 24, which is configured to present one or more interfaces, such as an e-commerce interface. The presented interface includes one or more components, such as, for example, one or more carousels, one or more dynamic components, one or more web components, etc. At least one of the components may be filled by a selected one of a plurality of content elements. In some embodiments, content elements for at least one of the interface components is selected by the content selection system 26.

In some embodiments, the content selection system 26 is configured to select a content element for filling an open slot using a trained content selection network. As discussed in greater detail below, the trained content selection network is configured to assign a context (or persona) to the user and select a content element based on the assigned persona. For example, in some embodiments, a predetermined number of potential content elements may be stored in a database, such as database 32. The set of potential content elements may have different short-term reward values given two or more user contexts. The total reward value for each of the two or more contexts may be calculated and the context having a higher total reward value assigned to the user. In some embodiments, content elements may be stored in a database 32 and retrieved by the content selection system 26. For example, in some embodiments, a set of potential content elements may be retrieved from the database 32. The trained content selection model selects presentation content elements from the set of one or more potential content elements.

As discussed in greater detail below, the trained neural network includes a context-selection element configured to select a context of a user interacting with the presented interface. For example, in some embodiments, a user may be sorted into one or more predetermined contexts corresponding to a group of customers having common characteristics. In some embodiments, a context may include, but are not limited to, life-stage contexts (e.g., single, married, family with a baby, etc.), department contexts (e.g., technology, fashion, sports, etc.), and/or any other suitable contexts. In some embodiments, the trained content selection model is configured to determine select elements based on a selected one of an individual context or a global context.

In some embodiments, the content selection system 26 receives a trained content selection model from a model training system 28. As discussed below, the model training system 28 is configured to implement a machine learning process using a reinforcement learning mechanism, such as, for example, a contextual bandit approach, a state-action-reward-state-action (SARSA) process, Thompson sampling, and/or any other suitable reinforcement learning mechanism. In some embodiments, the model training system 28 is configured to iteratively modify one or more machine learning (e.g., artificial intelligence, neural network, etc.) models based on additional training data, modified rewards values, and/or other data received from additional systems, such as the network interface system 24 and/or the content selection system 26.

Figure 3:
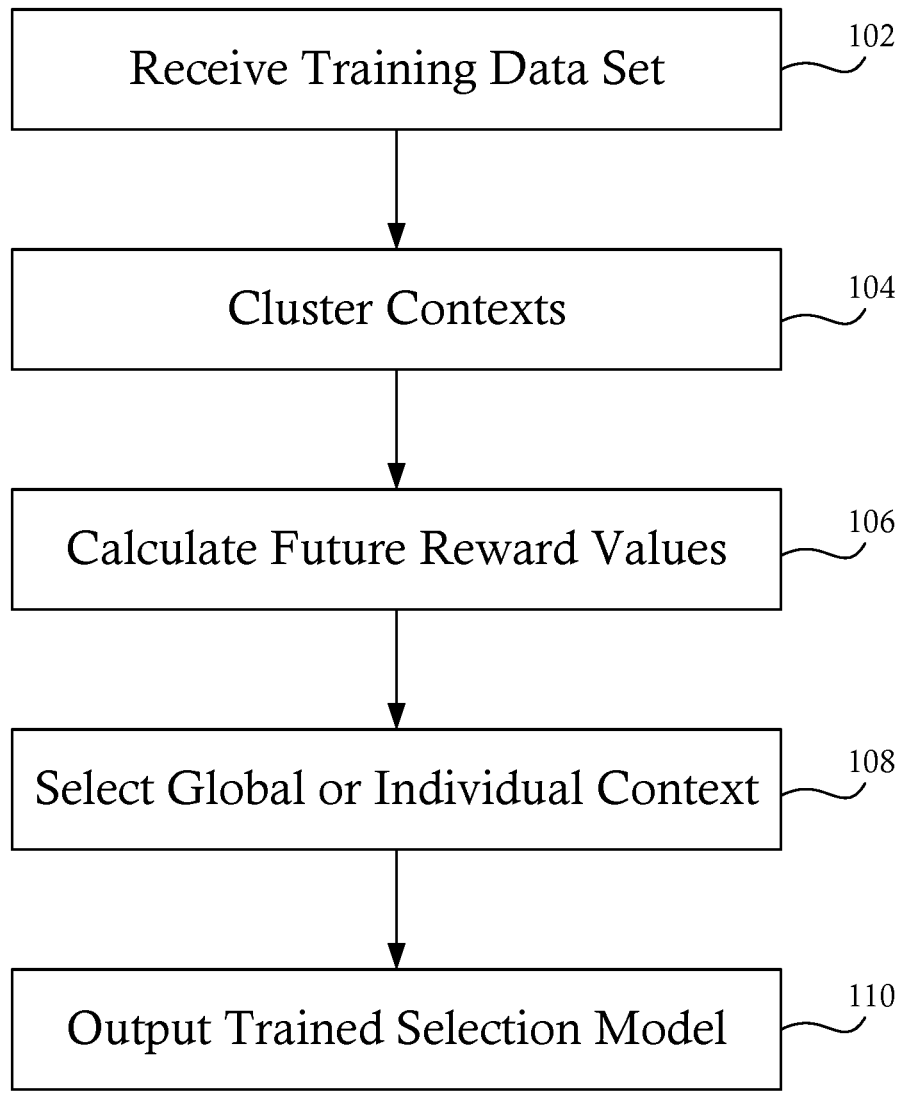
FIG. 3 illustrates a method of generating a trained content selection model, in accordance with some embodiments.
Figure 4:
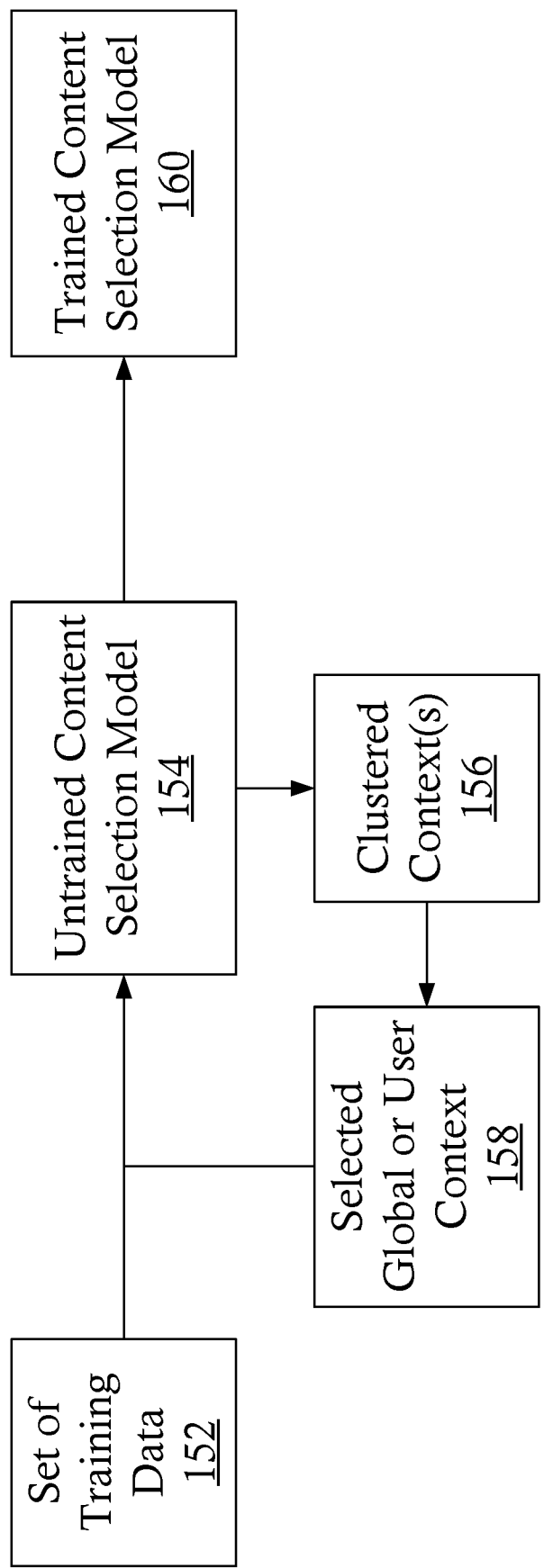
FIG. 4 illustrates a process of training a content selection model according to the method of FIG. 3, in accordance with some embodiments.

FIG. 3 is a flowchart illustrating a method 100 of generating a trained content selection model, in accordance with some embodiments. FIG. 4 is a process flow 150 illustrating various steps of the method 100 illustrated in FIG. 3, in accordance with some embodiments. At step 102, a set of training data 152 is received. The set of training data 152 includes a plurality of user impressions for at least one component in an interface (e.g., a plurality of user interactions with a component and one or more potential content elements for the component). The impression data may include a success or reward indication, such as, for example, a click-through rate, user return rate, historic purchase data, and/or any other suitable reward data. The impression data further includes one or more contexts for each of the plurality of user interactions.

In some embodiments, at optional step 104, two or more contexts ($C_j$) are clustered or otherwise combined. For example, in some embodiments, a set of contexts having less than a predetermined number of interactions and/or users may be combined into a single super-context. Contexts may be combined using any suitable mechanism, such as, for example, hierarchical clustering based on pairwise distance between contexts.

In some embodiments, a pairwise distance between each of the contexts is calculated based on a similarity and/or dissimilarity of each item associated with the context. Similarity and/or dissimilarity of each item may be calculated based on an (impression, click) pair between a first context and a second context. A weighted sum of percentiles for each item may be used to represent the overall distance between two contexts.

For example, in some embodiments, a distance between a first context A and a second context B is determined. The impressions for each item K in each of context A and B may be assumed to be a fixed number, e.g., $imp_A$, $imp_B$. The clicks for each item K in each of context A and context B may be represented as random variables, e.g., $clk_A$, $clk_B$, where:

$clk_A \sim \text{Binomial}(imp_A, p_1)$ $clk_B \sim \text{Binomial}(imp_B, p_2)$ The similarity function between an item K between context A and context B is then defined as:

$$PDF\left(\frac{clk_A}{imp_A} - \frac{clk_B}{imp_B} = \frac{x_1}{imp_A} - \frac{x_2}{imp_B} \mid p_1 = p_2\right)$$

where $x_1$ and $x_2$ are the observed clicks for item K in context A and context B, respectively. When $imp_A$ and $imp_B$ are large enough (e.g., have enough impressions), $$\frac{clk_A}{imp_A} \text{ and } \frac{clk_B}{imp_B}$$

can be approximated:

$$\frac{clk_A}{imp_A} \sim \text{Normal}\left(p_1, \frac{p_1(1-p_1)}{imp_A}\right)$$

$$\frac{clk_B}{imp_B} \sim \text{Normal}\left(p_2, \frac{p_2(1-p_2)}{imp_A}\right)$$

When $p_1 = p_2$, $$\frac{clk_A}{imp_A} - \frac{clk_B}{imp_B}$$

can be approximated:

$$\frac{clk_A}{imp_A} - \frac{clk_B}{imp_B} \sim \text{Normal}\left(0, \frac{\hat{p}(1-\hat{p})}{imp_A}, \frac{\hat{p}(1-\hat{p})}{imp_B}\right)$$

where $$\hat{p} = \frac{x_1 + x_2}{imp_A + imp_B}$$

The similarity function can then be expressed as:

$$\exp\left(-\frac{\left(\frac{x_1}{imp_A} - \frac{x_2}{imp_B}\right)^2}{2\left(\frac{\hat{p}(1-\hat{p})}{imp_A} + \frac{\hat{p}(1-\hat{p})}{imp_B}\right)}\right) \bigg/ \sqrt{2\pi\left(\frac{\hat{p}(1-\hat{p})}{imp_A} + \frac{\hat{p}(1-\hat{p})}{imp_B}\right)}$$

A dissimilarity function may be expressed as the inverse of the similarity function:

$$\ln\left(1 + \frac{Z}{\exp\left(-\frac{\left(\frac{x_1}{imp_A} - \frac{x_2}{imp_B}\right)^2}{2\left(\frac{\hat{p}(1-\hat{p})}{imp_A} + \frac{\hat{p}(1-\hat{p})}{imp_B}\right)}\right) / \sqrt{2\pi\left(\frac{\hat{p}(1-\hat{p})}{imp_A} + \frac{\hat{p}(1-\hat{p})}{imp_B}\right)}}\right)$$

where Z is a constant. The value of Z may be set arbitrarily and/or may be determined iteratively during training of the untrained content selection model 154.

At step 106, a future reward value for each context included in the training data set 152 is estimated. The future reward value may include any suitable reward value, such as, for example, a click-through rate (CTR), an add-to-cart rate, a purchase rate, etc. for a set of content elements associated with a context. The future reward value for each context may be calculated using any suitable process, such as, for example, applying one or more explore-exploit mechanisms, such as Thompsons sampling. In some embodiments, a global explore-exploit mechanism is configured to calculated a future reward value with respect to all user interactions/contexts including the set of training data 152 and one or more contextual explore-exploit mechanisms are configured to calculate future reward values with respect to individual contexts. All of the user impressions are grouped into a single bucket and a future reward is estimated for the entire set (or subset) of training data 152. Individual contextual explore-exploit mechanisms are applied to partitioned subsets of the set of training data 152 to calculate future reward values for each context independently.

In some embodiments, the global and/or individual explore-exploit mechanisms include Thompson sampling. U.S. patent application Ser. No. 16/748,313, entitled "Robust Reinforcement Learning in Personalized Content Prediction," filed concurrently with the present application, the disclosure of which is incorporated herein by reference in its entirety, discloses systems and methods for performing estimated future value calculations using Thompson sampling. For example, U.S. patent application Ser. No. 16/748,313 discloses a flow chart and process flow illustrating a method for generating a trained content selection model that utilizes Thompson Sampling. The aforementioned flow chart and process flow describe that a set of training data (e.g., set of training data 152) is received. The set of training data includes a plurality of user impressions for at least one component in an interface (e.g., a plurality of user interactions with a component and one or more potential content elements for the component). The impression data may include a success or reward indication, such as, for example, a click-through rate, user return rate, historic purchase data, and/or any other suitable reward data. In some embodiments, the set of training data is limited to data obtained from users having a predetermined persona.

Additionally, in some embodiments, the set of training data is used to iteratively train a content selection model (e.g., untrained selection model 154) to select an action $a_i$ based on a total reward value, Q. For example, in some embodiments, at least a portion of the set of training data is provided to an untrained content selection model (e.g., neural network). The content selection model selects an action based on a reward value Q. In some embodiments, the value Q is given by the equation:

$$Q(S_j, a_i) = r(S_j, a_i) + R(S_j, a_i)$$

In some embodiments, where r is the expected reward from a user in a current session (e.g., short-term reward) where $S_j$ is the persona of the user and $a_i$ is the action selected and R is the expected total discounted rewards from the user in future sessions (e.g., long-term reward).

In some embodiments, the short-term reward, r, and the long-term reward, R, may be estimated based on the expected value of a k-th impression:

$$r(S_j, a_i) = E[r_k(S_j, a_i)]$$

$$R(S_j, a_i) = E[R_k(S_j, a_i)]$$

The expected value of R may be estimated by the equation:

$$E[R_k(S_j, a_i)] = \sum_{g=1}^{m+1} \sum_{h=1}^{n} P(S_g, a_h) \times \gamma(t_k) \times Q(S_g, a_h)$$

where $\gamma(\bullet)$ is a long-term reward discount function, $t_k$ is the time until the next session for the user interacting with the k-th impression and $S_{m+1}$ is the state where a user does not return to the interface. The reward value Q for a user who does not return is: $Q(S_{m+1}, a_j) = 0 \forall i=1,2, \ldots, n$, since no rewards are provided for a user that does not interact with an interface. In some embodiments, it may also be assumed that $y(t)=0 \forall t \geq T$, where T is a time limit for the specific user to return to and interact with the interface. Based on the foregoing assumptions, the rewards at $S_{m+1}$ to are irrelevant and can be ignored.

In some embodiments, a posterior distribution technique, such as a state-action-reward-state-action (SARSA) algorithm modified to use Thompson sampling, is applied to the set of training data. For example, the value of $Q(\bullet, \bullet)$ is initialized as a normal distribution. The initial parameters of the normalized distribution may be set arbitrarily, based on empirical estimates, and/or based on prior values of Q for prior trained models. For instance, the value of $Q(\bullet, \bullet)$ a posterior (e.g., normalized) distribution by assuming that, for a given action $a_i$, the short-term reward and the state of the user in the next session are independent, the short term rewards of different sessions are independent, and the action taken in a session is independent of short-term rewards of previous sessions. Based on these assumptions, $$r(S_j, a_i) \| R(S_j, a_i) \forall j=1,2,\ldots,(m+1), i=1,2,\ldots,n$$

$$k=1,2,\ldots,K(S_j, a_i)$$

where $K(S_j, a_i)$ is the total number of impressions with context $S_j$ and action taken $a_i$ in the set of training data 152 (e.g., during a time period covered by the set of training date). Central limit theory provides:

$$\frac{\sum_{k=1}^{K(S_j,a_i)} r_k(S_j, a_i)}{K(S_j, a_i)} + \frac{\sum_{k=1}^{K(S_j,a_i)} R_k(S_j, a_i)}{K(S_j, a_i)} \sim N\left(Q(S_j, a_i), \frac{\sigma^2(S_j, a_i)}{K(S_j, a_i)}\right)$$

In some embodiments, it can be assumed that the prior distribution is given by:

$$Q(S_j, a_i) \sim N(\mu_0(S_j, a_i), a_0^2(S_j, a_i))$$

Combining the prior and empirical data, the posterior distribution of $Q(S_j, a_i)$ is:

$$Q(S_j,a_i) \sim N(\mu_{post}(S_j,a_i), \sigma^2_{post}(S_j,a_i)), \text{ where}$$

$$\mu_{post}(S_j, a_i) = \frac{w_1}{w_1+w_2}\mu_0(S_j, a_i) + \frac{w_2}{w_1+w_2}\left[\frac{\sum_{k=1}^{K(S_j,a_i)} r_k(S_j, a_i)}{K(S_j, a_i)} + \frac{\sum_{k=1}^{K(S_j,a_i)} R_k(S_j, a_i)}{K(S_j, a_i)}\right]$$

$$\sigma^2_{post}(S_j,a_i) = (w_1+w_2)^{-1}$$

$$w_1 = \frac{1}{\sigma_0^2(S_j, a_i)}$$

$$w_2 = \frac{K(S_j, a_i)}{\sigma^2(S_j, a_i)}$$

In some embodiments, $\sigma^2(S_j, a_i)$ is replaced with an empirical estimate $\hat{\sigma}^2(S_j, a_i)$.

In some embodiments, the long-term reward $R_k$ is not actually observed and estimate may be used instead:

$$R_k(S_j, a_i) = \sum_{g=1}^{m+1}\sum_{h=1}^{n} 1_{S_g} \times 1_{a_h} \times \gamma(t_k) \times \hat{Q}(S_g, a_h)$$

where $S_g$ is the user context in the next session, $a_h$ is the action taken, and Q is a sample taken from the existing posterior distribution. Based on prior assumptions, the only term remaining to be calculated is $\hat{\sigma}^2(S_j, a_i)$, where:

$$\hat{\sigma}^2(S_j,a_i) = \hat{var}(r_k(S_j,a_i)) + \hat{var}(R_k(S_j,a_i))$$

$$\hat{var}(r_k(S_j, a_i)) = \left(\frac{\sum_{k=1}^{K(S_j,a_i)} r_k^2(S_j, a_i)}{K(S_j, a_i)}\right) - \left(\frac{\sum_{k=1}^{K(S_j,a_i)} R_k(S_j, a_i)}{K(S_j, a_i)}\right)^2$$

$$\hat{var}(R_k(s_j,a_i)) = \hat{E}_{s_g,a_h}[\hat{var}(\gamma(t_k)\hat{Q}(s_g,a_h))] + \hat{var}_{s_g,a_h}[\hat{E}(\gamma(t_k)\hat{Q}(S_g,a_h))]$$

$$\hat{E}(\gamma(t_k)\hat{Q}(S_g, a_h)) = \frac{\sum_{l=1}^{L(S_j,a_i,S_g,a_h)} \gamma(t_l)\hat{Q}(S_g, a_h)}{L(S_j, a_i, S_g, a_h)}$$

$$\hat{var}(\gamma(t_k)\hat{Q}(S_g, a_h)) = \frac{\sum_{l=1}^{L(S_j,a_i,S_g,a_h)} (\gamma(t_l)\hat{Q}(S_g, a_h))^2}{L(S_j, a_i, S_g, a_h)} - [\hat{E}(\gamma(t_k)\hat{Q}(S_g, a_h))]^2$$

$$\hat{E}_{S_g,a_h}[\hat{var}(\gamma(t_k)\hat{Q}(S_g, a_h))] = \sum_{g=1}^{m+1}\sum_{h=1}^{n} \frac{L(S_j, a_i, S_g, a_h)}{K(S_j, a_i)} \hat{var}(\gamma(t_k)\hat{Q}(S_g, a_h))$$

$$\hat{var}_{S_g,a_h}[\hat{E}(\gamma(t_k)\hat{Q}(S_g, a_h))] =$$

$$\sum_{g=1}^{m+1}\sum_{h=1}^{n} \frac{L(S_j, a_i, S_g, a_h)}{K(S_j, a_i)} [\hat{E}(\gamma(t_k)\hat{Q}(S_g, a_h))]^2 -$$

$$\left[\sum_{g=1}^{m+1}\sum_{h=1}^{n} \frac{L(S_j, a_i, S_g, a_h)}{K(S_j, a_i)} [\hat{E}(\gamma(t_k)\hat{Q}(S_g, a_h))]\right]^2$$

where $L(S_j, a_i, S_g, a_h)$ is the number of impressions where the context $S_j$, action $a_i$ was taken, the context of a subsequent session (before time T) of the same user was $S_g$ and action $a_h$ was taken.

Additionally, in some embodiments, a given context $S_j$, a sample of potential rewards is generated for each action $a_h$ and a subsequent action is selected using Thompson sampling. The prior distribution (or existing posterior distribution if a set of impressions has been previously processed) is used on Q to generate samples needed for estimation of $\mu_{post}(S_j, a_i)$ and $\hat{\sigma}^2(S_j, a_i)$ for all $j=1, 2, \ldots, m$ and $i=1, 2, \ldots, n$. It is noted that $Q(S_{m+1}, a_i)=0$ with a probability of 1 for all $i=1, 2, \ldots, n$ such that all samples 156 generated from a distribution of state $S_{m+1}$ is 0. After the batch update is done on a subset of the set of training data, a new posterior distribution Q is generated and Thompson sampling is applied to choose an action for a given context.

In some embodiments, the posterior distribution Q is updated using a subset of the impressions contained in the set of training data. For each impression in the subset, a previous session of the user within time T is identified. The state $S_j$ and the action $a_i$ of the user during the previous session (e.g., prior impression) is obtained. For each state $S_j$ and action $a_i$ identified, the posterior distribution $Q(S_j, a_i)$ is determined and the long-term reward information updated based on the updated posterior distribution. The posterior distribution Q is set as a prior distribution and the posterior of Q is updated using the empirical data contained in the training data for the subset of impressions.

In some embodiments, initializing Q, generating a sample of rewards and updating the posterior distribution of Q are repeated (i.e., iterated) multiple times to generate a trained content selection model. Additionally, the trained content selection model is output to one or more systems, such as, for example, the content selection system 26. The trained content selection model is configured to eliminate errors caused by randomness in point estimates and reduces issues due to noise associated with point estimates. In some embodiments, Thompson sampling provides a more robust interface as compared to other explore-exploit techniques. The posterior distribution of expected reward provides a better consideration of possible action as compared to point estimates.

In some embodiments, individual explore-exploit mechanisms having a robust data set (e.g., a robust data subset within the set of training data 152) will have a higher future reward value as compared to a global explore-exploit mechanism. A large number of interactions in the set of training data 152 allows accurate prediction of reward rates and thus allows the individual contexts to present targeted content more likely to be relevant as compared to a global context using general item recommendations. However, in some embodiments, the individual context does not have a robust subset of data and/or does not have accurate impression data. In such cases, a global context may provide a higher future reward value as compared to the individual context.

For example, in some embodiments, a future reward value is calculated for each contextualized (e.g., individual) persona and a global person based on the set of training data 152, for a future time $D_{future}$. The set of training data 152 includes a set of past interactions (or impressions) for a time period $D_{past}$. The set of past interactions may include user interactions encompassing any suitable time period, such as, for example, a time period extending back to a predetermined start point (e.g., a predetermined date, a system time, an arbitrary start time, etc.). In some embodiments, the training data set 152 includes a set of recent interactions that includes interactions from a predetermined time period, such as, for example, interactions within a predetermined time period from the current time (e.g., prior week, month, etc.). The set of recent items, may be used to generate a mock period $D_{mock}$, for estimating the reward value of a set of future items in $D_{future}$.

In some embodiments, the future reward value for a global persona is calculated as a click-through rate ($CTR_{global}$) according to the equation:

$$CTR_{global} = \sum_{k=1}^{n} \left( q_k * \frac{p_k}{\sum_{j=1}^{n} p_j} \right)$$

where $p_k$ is the click-through rate in $D_{past}$, $p_j$ is the reward value for the j-th interaction, and $q_k$ is the click-through rate in $D_{future}$. In some embodiments, $p_k$ is calculated as:

$$p_k \sim \text{Beta}(S_k, N_k - S_k)$$

where $N_k$ is the number of impressions and $S_k$ is a number of clicks for each item $I_k$ in a set of items for k=1, 2, ..., n in the set of past impression $D_{past}$. Similarly, the future reward value $q_k$ may be estimated as:

$$q_k \sim \text{Beta}(X_k, M_k - X_k)$$

where $M_k$ is the number of impressions and $X_k$ is a number of clicks for each item $I_k$ in a set of items for k=1, 2, ..., n in the set of mock impression $D_{mock}$.

In some embodiments, a future reward value for each contextualized (e.g., individual) persona, is calculated as a click-through rate ($CTR_{contextual}$) according to the equation:

$$CTR_{contextual} = \sum_{l=1}^{L} \left[ pct_l * \left( \sum_{k=1}^{n_l} \left( q_{lk} * \frac{p_{lk}}{\sum_{j=1}^{n_l} p_{lj}} \right) \right) \right]$$

where $p_{lk}$ is a sampled click-through rate, $q_{lk}$ is the click-through rate in $D_{future}$ for each item $I_{lk}$ associated with a context $C_l$, and $pct_l$ is the proportion of impressions to customers for the context $C_l$ in $D_{future}$ where l=1, 2, ..., L, k=1, 2, ..., $n_l$, and $\Sigma_1^L pct_l = 1$. In some embodiments, the sampled click-through rate is:

$$p_{lk} \sim \text{Beta}(S_{lk}, N_{lk} - S_{lk})$$

where $S_{lk}$ is a number of clicks and $N_{lk}$ is a number of impressions for each item $I_{lk}$ associated with a context $C_l$. Similarly, in some embodiments, the click-through rate in $D_{future}$ for each item $I_{lk}$ is estimated based on impressions for each context $C_l$ in period $D_{mock}$:

$$q_{lk} \sim \text{Beta}(X_{lk}, M_{lk} - X_{lk})$$

where $X_{lk}$ is the number of clicks and $M_{lk}$ is the number of impressions for each item $I_{lk}$ associated with a context $C_l$. The proportion of impressions to customers for the context $C_l$ in $D_{future}$ may be estimated based on the impressions for each context $C_l$ in $D_{mock}$:

$$(pct_1, \ldots, pct_L) \sim \text{Dirichlet}(imp_1, \ldots, imp_L)$$

where $imp_L$ is the impressions for each context $C_l$ in $D_{mock}$.

In some embodiments, the global click-through rate ($CTR_{global}$) and the contextual click-through rates, ($CTR_{contextual}$) may be estimated using bootstrapping. A 95% confidence interval (e.g., $CTR_{contextual}$ (lower_bound ($CTR_{contextual}$), upper_bound ($CTR_{contextual}$)) $CTR_{global}$ (lower_bound ($CTR_{global}$), upper_bound($CTR_{global}$)). may also be generated by bootstrapping.

At step 108, for each individual context, the future reward of the specific context rate (e.g., $CTR_{contextual}$) is compared to the future reward rate of the global context (e.g., $CTR_{global}$) and the context having the higher reward is assigned for use in content selection. For example, if $CTR_{contextual}$ is higher than $CTR_{global}$, the content elements and selection process for that context is used to select content elements for presentation to a user. However, if $CTR_{global}$ is higher, the global context is used to select content elements.

At step 110, a trained content selection model 160 is output to one or more systems, such as, for example, the content selection system 26. The trained content selection model 160 is configured to select content elements for each user using the selected one of an individual assigned context or a global context. In some embodiments, the trained content selection model 160 is configured to first select one of a plurality of content elements for presentation to a user based on the selected context, e.g., individual context or global context.

Figure 5:
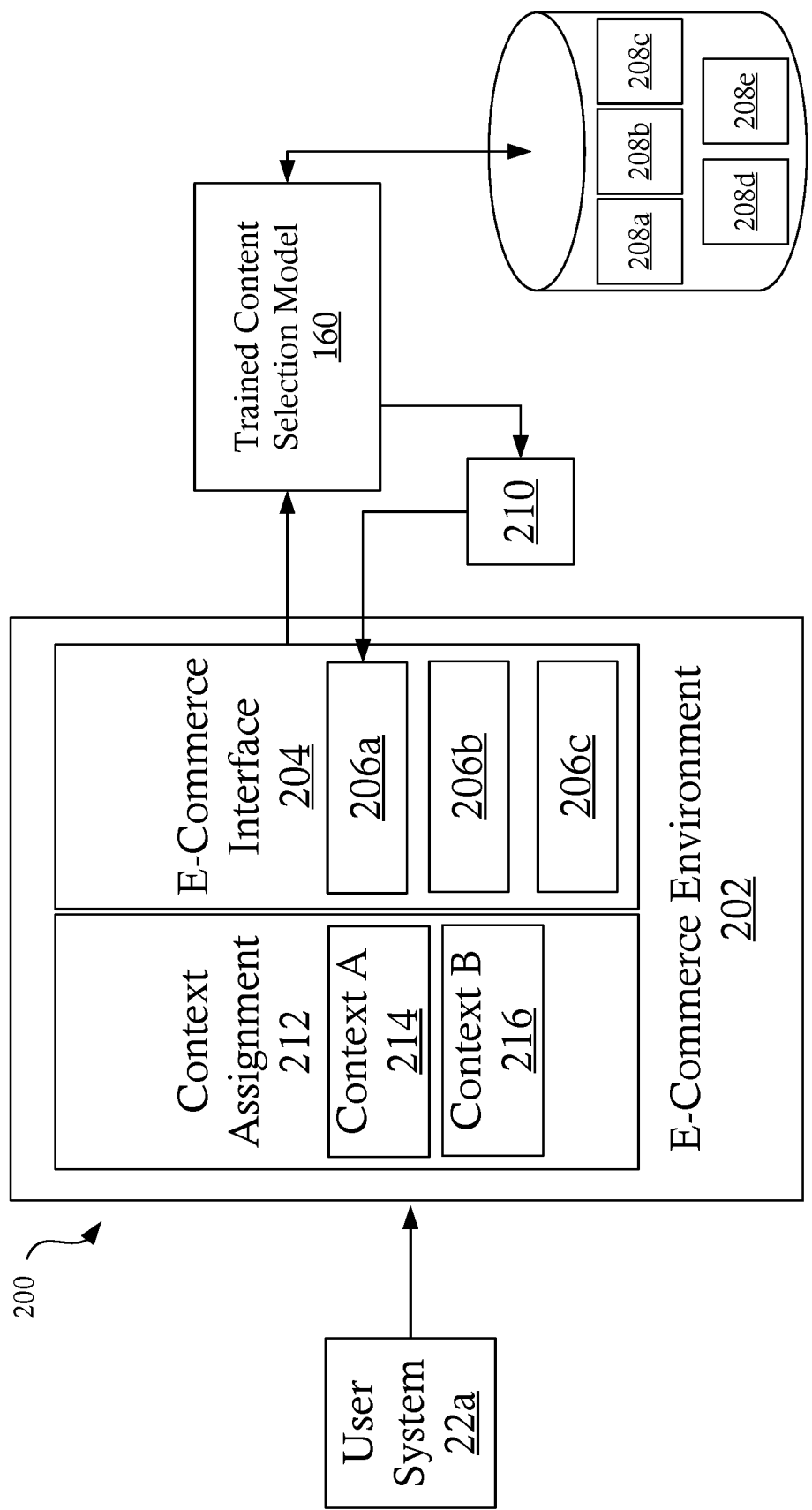
FIG. 5 illustrates a content selection process for selecting content for presentation to a user using a trained content selection model, in accordance with some embodiments.

FIG. 5 illustrates a content selection process 200 based on a selected context using a trained content selection model 160, in accordance with some embodiments. At time $t_0$, a user interacts with a computer environment, such as an e-commerce environment 202, through one or more systems, such as, for example, a user system 22a. The user is assigned to a user context by a context assignment element 212. Context assignment may be based on, for example, prior interactions between the user (or other users) and the e-commerce environment 202, information provided by the user, etc. The user may be assigned to one of a plurality of contexts 214, 216. In some embodiments, multiple contexts may be assigned to a single user. Context may include, but are not limited to, life-stage contexts (e.g., single, married, family with a baby, etc.), department contexts (e.g., technology, fashion, sports, etc.), and/or any other suitable contexts.

The e-commerce environment 202 presents an e-commerce interface 204 having a plurality of content containers 206a-206c (collectively "content containers 206"). At least one of the content containers 206, such as a first content container 206a, is configured to receive at least one content element selected from a plurality of content elements 208a-208e. The plurality of content elements 208a-208e may be stored in and retrieved from any suitable storage, such as, for example, a content database 32. The potential content elements 208a-208e are selected, at least partially, based on either the user context or a global context.

For example, at time $t_0$, a user may interact with the e-commerce environment 202 and be assigned to a first context, context A. The selected context is provided to a trained content selection model 160, which is configured to select one of the plurality of potential content elements 208a-208e for presentation to a user in the first content container 206a. As discussed above, during training, the trained content selection model 160 compares the expected future reward value for each potential context and a global context to determine which has a higher expected future reward rate. The trained content selection model 160 receives the first context (context A) and determines whether to use content associate with context A or the global context. In an example embodiment, at time $t_0$, the trained content selection model 160 determines that the global context has a higher future reward value and selects content elements 208a-208e based on the global context.

At time $t_1$, the same user interacts with the e-commerce environment 202 and is a assigned to a second context, context B. The trained content selection model 160 receives the second context (context B) and determines that the contextual persona associated with context B has a higher future reward value than the global persona and selects content elements 208a-208e based on the selected second context.

At time $t_2$, the user again interacts with the e-commerce environment 202 and is again assigned to the first context, context A. The trained content selection model 160 receives the first context (context A) and determines that the contextual persona associated with context A has a higher future reward value than the global persona (as opposed to $t_0$, at which the global persona was selected). The trained content selection model 160 selects content elements 208a-208e based on the selected first context.

The trained content selection model 160 selects presentation content element 210 from among the potential content elements 208a-208e and presents the selected presentation content element 210 to the user in the first content container 206a of the e-commerce interface 204. After receiving the e-commerce interface 204, a user may perform one or more actions. In some embodiments, a set of presentation content elements 210 are preselected for users having a first persona such that the e-commerce interface 204 with the selected presentation content elements 210 may be cached and provided to a user having a given context without delay. The trained content selection model 160 may be configured to select between specific contexts and the global context and/or select presentation content elements 210 on a predetermined interval, such as, for example, selecting new elements each day, week, month, etc.

In some embodiments, the one or more actions performed by the user after presentation of the e-commerce interface 204 including the presentation content element 210 is recorded and used for training of future iterations of the trained content selection model 160. For example, in various embodiments, the trained content selection model 160 may be replaced with an updated trained content selection model that has been trained using user interaction data from e-commerce interfaces 204 including presentation content elements 210 selected by the prior version of the trained content selection model 160. In some embodiments, the trained content selection model 160 may be updated and/or replaced on a predetermined interval, such as, for example, weekly, monthly, bi-monthly, etc.

Although the subject matter has been described in terms of exemplary embodiments, it is not limited thereto. Rather, the appended claims should be construed broadly, to include other variants and embodiments, which may be made by those skilled in the art.

What is claimed is:

1. A system for content selection and presentation, comprising:
a communications interface that communicates with a computing device of each of a plurality of users of an online platform to obtain user data;
a database storing a plurality of content elements;
a memory resource storing instructions; and
a processor coupled to the communications interface, the database and the memory resource, the processor being configured to execute the instructions to:
receive, from a first device of a user of the plurality of users, user data indicating one or more instances the user interacted with one or more content elements associated with the online platform on an interface presented by the first device of the user, the interface including a plurality of containers;
obtain, from the database, the plurality of content elements configured for presentation in at least a first content container of the plurality of containers;
iteratively implement a machine learning process that generates a trained selection model by utilizing a reinforcement learning mechanism and at least an individual explore-exploit mechanism;
based on the user data, implement, by utilizing the trained selection model, a selection process to fill at least the first content container of the interface with a content element of the plurality of content elements, the selection process comprising:
selecting a context of a plurality of contexts including an individual context or a global context, the selection being based on a comparison of an expected future reward value of the individual context and an expected future reward value of the global context, wherein the expected future reward value of the global context ($CTR_{global}$) is calculated according to:

$$CTR_{global} = \sum_{k=1}^{n} \left( q_k * \frac{p_k}{\sum_{j=1}^{n} p_j} \right)$$

where $p_k$ is a past click-through rate, $p_j$ is a reward value for a j-th interaction, and $q_k$ is a future click-through rate;
based at least on the selected context, selecting a first content element associated with the selected context; and
generate and present the selected first content element in the first content container of the interface on a display of the first device of the user.

2. The system of claim 1, wherein the expected future reward value is a click-through rate.

3. The system of claim 1, wherein the expected future reward value is estimated using Thompson sampling.

4. The system of claim 1, wherein the expected future reward value of the individual context ($CTR_{contextual}$) is calculated according to:

$$CTR_{contextual} = \sum_{l=1}^{L} \left[ pct_l * \left( \sum_{k=1}^{n_l} \left( q_{lk} * \frac{p_{lk}}{\sum_{j=1}^{n_l} p_{lj}} \right) \right) \right]$$

where $p_{lk}$ is a sampled click-through rate, $q_{lk}$ is a future click-through rate for each item $I_{lk}$ associated with the individual context $C_l$, $p_{lj}$, is a reward value for a j-th interaction associated with the individual context $C_l$ and $pct_l$ is a proportion of impressions to customers for the individual context $C_l$ where $l=1,2, \ldots, L$, $k=1,2, \ldots, n_l$, and $\Sigma^L_1 pct_l = 1$.

5. The system of claim 1, wherein the individual context is two or more individual contexts combined.

6. The system of claim 5, wherein the two or more individual contexts are combined based on a pairwise distance.

7. A non-transitory computer readable medium having instructions stored thereon, wherein the instructions, when executed by a processor cause a device to perform operations comprising:
receiving, from a first device of a user of a plurality of users of an online platform, user data indicating one or more instances the user interacted with one or more content elements associated with the online platform on an interface presented by the first device of the user, the interface including a plurality of containers;
obtaining, from a database, a plurality of content elements configured for presentation in at least a first content container of a plurality of content containers;
iteratively implementing a machine learning process that generates a trained selection model by utilizing a reinforcement learning mechanism and at least an individual explore-exploit mechanism;
based on the user data, implementing, by utilizing the trained selection model, a selection process to fill at least the first content container of the interface with a content element of the plurality of content elements, the selection process comprising:
selecting a context of a plurality of contexts including an individual context and a global context, the selection being based on a comparison of an expected future reward value of the individual context and an expected future reward value of the global context, wherein the expected future reward value of the global context ($CTR_{global}$) is calculated according to:

$$CTR_{global} = \sum_{k=1}^{n} \left( q_k * \frac{p_k}{\sum_{j=1}^{n} p_j} \right)$$

where $p_k$ is a past click-through rate, $p_j$ is a reward value for a j-th interaction, and $q_k$ is a future click-through rate;
based at least on the selected context, select, by the trained selection model, a first content element associated with the selected context; and
generating and presenting the selected first content element in the first container of the interface on a display of the first device of the user.

8. The non-transitory computer readable medium of claim 7, wherein the expected future reward value is a click-through rate.

9. The non-transitory computer readable medium of claim 7, wherein the expected future reward value is estimated using Thompson sampling.

10. The non-transitory computer readable medium of claim 7, wherein the expected future reward value of the individual context ($CTR_{contextual}$) is calculated according to:

$$CTR_{contextual} = \sum_{l=1}^{L} \left[ pct_l * \left( \sum_{k=1}^{n_l} \left( q_{lk} * \frac{p_{lk}}{\sum_{j=1}^{n_l} p_{lj}} \right) \right) \right]$$

where $p_{lk}$ is a sampled click-through rate, $q_{lk}$ is a future click-through rate for each item $I_{lk}$ associated with the individual context $C_1$, $p_{lj}$ is a reward value for a j-th interaction associated with the individual context $C_l$, and $pct_l$ is a proportion of impressions to customers for the individual context $C_l$ where $l=1,2, \ldots, L$, $k=1,2, \ldots, n_l$, and $\Sigma^L_1 pct_l = 1$.

11. The non-transitory computer readable medium of claim 7, wherein the individual context is two or more individual contexts combined.

12. The non-transitory computer readable medium of claim 11, wherein the two or more individual contexts are combined based on a pairwise distance.

13. A computer-implemented_method comprising:
receiving, from a first device of a user of a plurality of users of an online platform, user data indicating one or more instances the user interacted with one or more content elements associated with the online platform on an interface presented by the first device of the user, the interface including a plurality of containers;
obtaining, from a database, a plurality of content elements configured for presentation in at least a first content container of a plurality of content containers;
iteratively implementing a machine learning process that generates a trained selection model by utilizing a reinforcement learning mechanism and at least an individual explore-exploit mechanism;
based on the user data, implementing, by utilizing the trained selection model, a selection process to fill at least the first content container of the interface with a content element of the plurality of content elements, the selection process comprising:
selecting a context of a plurality of contexts including an individual context and a global context, the selection being based on a comparison of an expected future reward value of the individual context and an expected future reward value of the global context, and wherein the expected future reward value of the global context ($CTR_{global}$) is calculated according to:

$$CTR_{global} = \sum_{k=1}^{n} \left( q_k * \frac{p_k}{\sum_{j=1}^{n} p_j} \right)$$

where $p_k$ is a past click-through rate, $p_j$ is a reward value for a j-th interaction, and $q_k$ is a future click-through rate;
based at least on the selected context, select, by the trained selection model, a first content element associated with the selected context; and
generating and presenting the selected first content element in the first content container of the interface on a display of the first device of the user.

14. The method of claim 13, wherein the expected future reward value of the individual context ($CTR_{contextual}$) is calculated according to:

$$CTR_{contextual} = \sum_{l=1}^{L} \left[ pct_l * \left( \sum_{k=1}^{n_l} \left( q_{lk} * \frac{p_{lk}}{\sum_{j=1}^{n_l} p_{lj}} \right) \right) \right]$$

where $p_{lk}$ is a sampled click-through rate, $q_{lk}$ is a future click-through rate for each item $I_{lk}$ associated with the individual context $C_1$, $p_{ij}$, is a reward value for a j-th interaction associated with the individual context $C_1$, and $pct_l$ is a proportion of impressions to customers for the individual context $C_l$ where $l=1,2, \ldots, L$, $k=1,2, \ldots, n_1$, and $\Sigma^L_{\ 1} pct_l = 1$.

15. The method of claim 13, wherein the individual context is two or more individual contexts combined.

* * * * *